United States Patent
Messner

[11] 3,859,027
[45] Jan. 7, 1975

[54] MULTI-ROLL CALENDER FOR PLASTIC MATERIAL

[76] Inventor: Jakob Messner, 66 Unterschauersberg, A-4600 Wels, Thalheim, Austria

[22] Filed: Sept. 20, 1972

[21] Appl. No.: 290,641

Related U.S. Application Data

[63] Continuation-in-part of Ser. No. 52,482, July 6, 1970, abandoned.

[52] U.S. Cl. .................. 425/363, 425/DIG. 235
[51] Int. Cl. ............................................ B29c 15/00
[58] Field of Search ........ 425/363, 324 R, 335, 194, 425/201, 367, 336, DIG. 235, 369

[56] References Cited
UNITED STATES PATENTS

| | | | |
|---|---|---|---|
| 2,260,453 | 10/1941 | Hartman | 264/175 X |
| 2,651,242 | 9/1953 | Neely | 425/363 |
| 2,889,390 | 6/1959 | Schwartz | 264/175 X |
| 3,145,418 | 8/1964 | Kusters | 425/363 |
| 3,299,837 | 1/1967 | Lind | 425/335 |
| 3,632,258 | 1/1972 | Faerber | 425/367 |

Primary Examiner—Andrew R. Juhasz
Assistant Examiner—David B. Smith
Attorney, Agent, or Firm—Mason, Mason & Albright

[57] ABSTRACT

One roll of a calender for plastics material is of profiled form, preferably sinusoidal, to enable surplus material produced when sheet or foil is thinned down to be displaced rapidly. Alternatively an additional roll of profiled form can co-operate with a conventional roll to achieve the same effect. The dimensions of the profiled form of the one roll are critical to proper operation and in particular the length of each crest in relation to the corresponding trough should be approximately equal to 1:2 to 2.5:1; the width of each trough in relation to the depth thereof should be approximately equal to 2:1 to 5:1; the length of each crest in relation to the depth of each trough should be approximately equal to 8:1 to 2:1; the diameter of the smooth roll in relation to the profiled roll should be approximately equal to 3.5:1 to 1:2 and the ratio of the peripheral speeds of the smooth roller to that of the profiled roller should be approximately equal to 1.20:1 to 1:1.20.

3 Claims, 7 Drawing Figures

PATENTED JAN 7 1975 3,859,027

INVENTOR
JACOB MESSNER
BY
Mason, Mason & Albright
ATTORNEYS

A MULTI-ROLL CALENDER FOR PLASTIC MATERIAL

CROSS-REFERENCE TO RELATED APPLICATION

This application is a continuation-in-part application to application Ser. No. 52,482 filed July 6, 1970 in the name of Jakob Messner and now abandoned.

BACKGROUND OF THE INVENTION

1. Field of the Invention

This invention relates to apparatus for reducing the time spent by the squeezed-out material in the roll nip of a multi-roll calender.

2. Summary of the Prior Art

In the production of foil or sheet from hot plasticized mixes by calendering, the material to be worked must be formed into a freely running dough in the nip between two rolls. This is ensured by using material of suitable composition, preparing it hot and maintaining suitable temperatures. A perfect surface finish can be given to the sheet or foil only if the dough flows freely. A standing ridge at the nip is produced, as is well known, by squeezing out part of the material arriving at the face of the rolls, so that the sheet formed in the nip is slightly thinner than the sheet fed in. The squeezed-out material adds to the width and the material squeezed from the middle of the standing ridge migrates to the edges, where it passes through the gap in the rolls as a widening of the sheet.

All plastics materials, when subjected to heating to a given temperature over a long period, are adversely affected, the result being discoloration, brittleness, reduced strength, bubble formation and so forth. To prevent such action or to enable processing to be deferred until a higher temperature is reached, the materials are supplied with additives which confer short-term stability to them. Such additives make processing possible, but they cause a certain deterioration in the properties of the end product, especially if they have to be added in large quantities. These additives also add to the cost of the material. The amount of additive required depends on its effectiveness, on the composition of the material, on the processing temperature concerned and on the length of time for which it is required to act.

To obtain a properly running dough, the processing temperature should be as high as possible. During calendering, most of the material fed to the rolls passes in succession through the roll nip without any diversion. Only that part which is squeezed out laterally has its sojourn time considerably increased, by 20 or 30 times, for example. This portion, because it flows towards the ends of the rolls, is trimmed off as a strip and rolled-in again. In this way, material that has been subjected to a considerable thermal stress is exposed to stress a second time.

An object of the present invention is to provide a calender for achieving a rapid change of material and hence a relatively short sojourn time in the standing ridge.

SUMMARY OF THE INVENTION

According to the present invention there is provided a calender comprising
 a first, cylindrical, roll having a smooth profile,
 a second roll co-operating with the first roll to form a first nip and having peripherally extending corrugations spaced along the length of the roll to form crests and troughs,
 a third roll, having a smooth profile, and
 a fourth roll having a smooth profile and co-operating with the third roll to provide a second nip downstream of the first nip,
 said second roll having the following characteristics:
  a. the ratio of the length of each crest to the width of each trough being in a range of approximately 1:2 to 2.5:1
  b. the ratio of the width of each trough to the depth of each trough being in a range of approximately 2:1 to 5:1 and
  c. the ratio of the length of each crest to the trough depth being in a range of approximately 8:1 to 2:1
 said first and second rolls having together the following characteristics:
  a. the ratio of the diameter of the first roll to the diameter of the second roll being in a range of approximately 3:5:1 to 1:2 and
  b. the ratio of the peripheral speed of the first roll to the peripheral speed of the second roll being in a range of approximately 1.20:1 to 1:1.20 and
 the first and second nips being arranged to receive a web in the same relative orientation, and
 the corrugations of the second roll serving to reduce the time spent by the squeezed-out material at the first nip by allowing material in the standing ridge to migrate into the troughs and so pass through the nip.

BRIEF DESCRIPTION OF THE DRAWINGS

Three embodiments of calender in accordance with the invention will be explained in somewhat greater detail hereinafter with reference to the accompanying diagrammatic drawings, in which.

DESCRIPTION OF THE PREFERRED EMBODIMENTS

Figure 1:
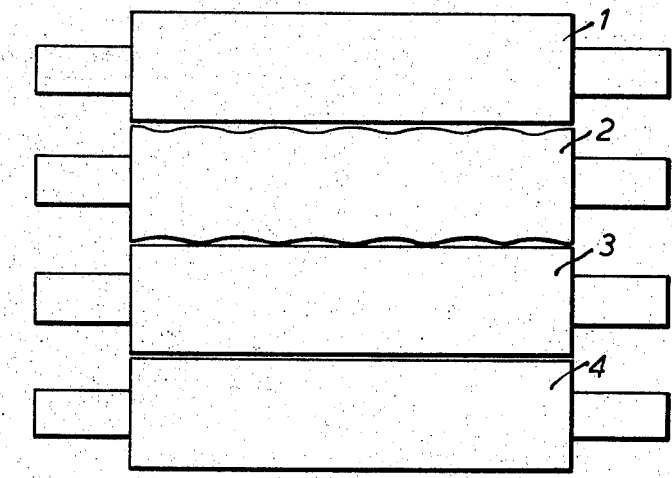
FIG. 1 is a front elevation of one embodiment of calender.
Figure 2:
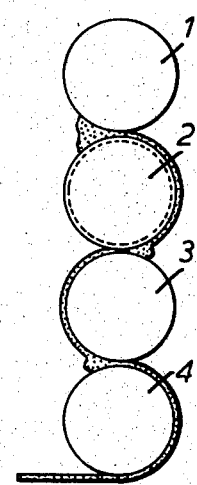
FIG. 2 is a side elevation of the embodiment shown in FIG. 1.

FIGS. 1 and 2 are front and side elevations respectively of a four-roll calender, the rolls being numbered 1 to 4. The second roll 2 is profiled to have successive wave crests 2a, and wave troughs 2b, so that at the wave crests 2a (FIG. 3) the material is squeezed out into a standing ridge at the entry to the nip, whereas in the wave troughs 2b the material flows out of the standing ridge. In this way, the sojourn time of the squeezed-out material in the standing ridge is reduced. This reduction arises because material initially at the center of the roll nip needs to migrate only to the nearest trough, whereas the conventional plain rolls, such material must move transversely to the roll nip within the standing ridge until it has been squeezed out laterally of the rolls. The material of the standing ridge is thus under thermal stress for an appreciable length of time where plain rolls are used.

The upper roll can be profiled instead of the roll 2. The rolls 3 and 4 are not profiled.

Figure 3:
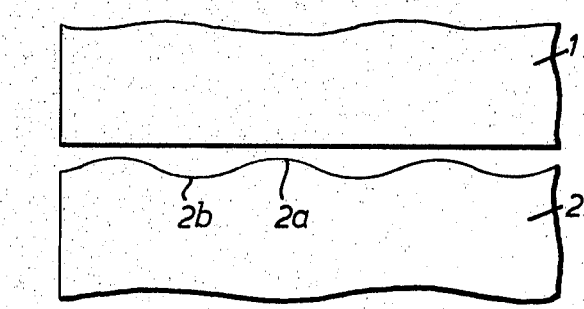
FIG. 3 is a front elevation, to an enlarged scale, of a portion of FIG. 1.
Figure 5:
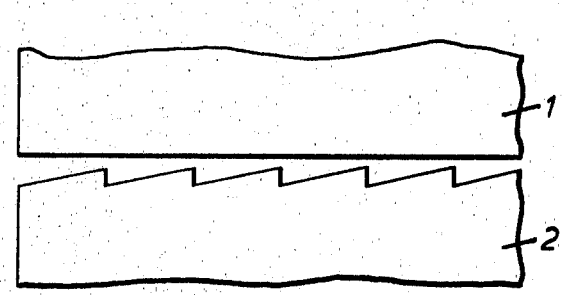
FIG. 5 is a front elevation, to an enlarged scale, of a portion of a further embodiment of calender.

The profile may be of waveform (sinusoidal) shape (FIG. 3) or sawtooth-shaped (FIG. 5). As FIG. 3 shows, the associated wave crests 2a and wave troughs 2b lie respectively on continuous peripheral lines. It is also possible, however, for the wave crests and troughs to run in such a direction as to follow a helical path along the face of the roll 2.

Another way of providing the wave crests and troughs is to fit rings with convex outer faces side by side on a spindle.

The profiled rolls 2, of FIGS. 3 and 5 each have the following relative dimensions: (a) the ratio of the length of each crest to the width of each trough being approximately 3:4, (b) the ratio of the width of each trough to depth of each trough being approximately 4:1, (c) the ratio of the length of each crest to the trough depth being approximately 3:1, (d) the ratio of the diameter of each smooth roll to the diameter of each profiled roll being approximately 1:1, and (e) the ratio of the peripheral speed of the smooth roller to the peripheral speed of the corrugated roller being approximately 1:1.

Figure 4:
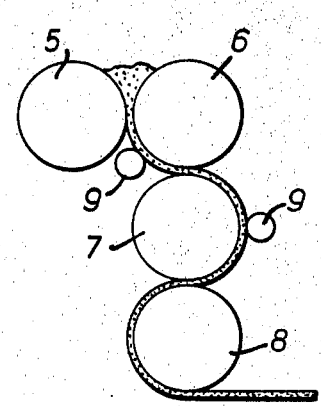
FIG. 4 is a side elevation of another embodiment of calender.

FIG. 4 shows an F-type calender in which the rolls, 5 to 8, have plain, that is to say not undulating, faces. Here, an additional roll 9, suitably profiled on its outer face, is associated with the roll 6 and can be moved towards it. The peripheral speed of the roll 9 can be infinitely varied and the roll can be heated and cooled. It may also be equipped with a device (not shown) for setting it obliquely or bowing it. The additional roll 9 may be associated not with the roll 6, but with the roll 7 or with both rolls 6 and 7.

Figure 6:
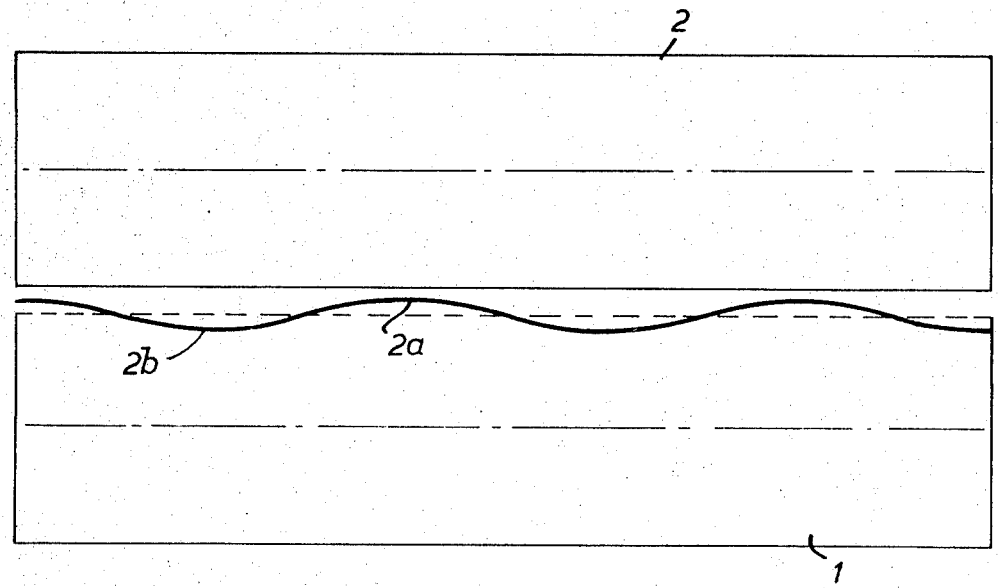
FIG. 6 shows the course of the material in the roll nip.

FIG. 6 indicates the path of the material in a roll nip. The material squeezed out from the wave crest 2a on the roll 1 flows away into the wave trough 2b, so that it has only a short distance to move, which clearly shows the advantage of the invention, namely a reduction in the time spent by the material within the roll nip.

Figure 7:
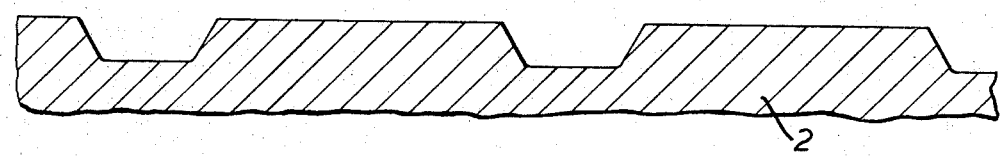
FIG. 7 is a fragmentary longitudinal section of a still further embodiment of a roll in accordance with the invention.

FIG. 7 is a fragmentary longitudinal section showing a still further form of corrugation. In this embodiment the corresponding dimensional ratios are: (a) ratio of the length of each crest to the width of each trough being approximately 2:1, (b) the ratio of the width of each trough to the depth of each trough being approximately 3:1, (c) the ratio of the length of each crest to the trough depth being approximately 6:1, (d) the ratio of the diameter of each smooth roll to the diameter of each profiled roll being approximately 2.5:1, and (e) the ratio of the peripheral speed of the smooth roller to the peripheral speed of the corrugated roller being approximately 1.05:1.

I claim:

1. A calender comprising:
   a first cylindrical roll having a smooth profile;
   a second roll co-operating with the first roll to form a first laterally-uninterrupted nip and having peripherally extending corrugations spaced along the length of the roll to form crests and troughs;
   a third roll having a smooth profile; and
   a fourth roll having a smooth profile and co-operating with the third roll to provide a second nip downstream of the first nip;
   said second roll having the following characteristics at the median line of the corrugations:
   a. the ratio of the length of each crest to the width of each trough being within a range of approximately 1:2 to 2.5:1,
   b. the ratio of the width of each trough to the depth of each trough being within a range of approximately 2:1 to 5:1, and
   c. the ratio of the length of each crest to the trough depth being within a range of approximately 8:1 to 2:1;
   said first and second rolls having together the following characteristics:
   a. the ratio of the diameter of the first roll to the diameter of the second roll being within the range of approximately 3.5:1 to 1:2,
   b. the ratio of the peripheral speed of the first roller to the peripheral speed of the second roll being within a range of approximately 1.20:1 to 1:1.20; and
   the first and second nips being arranged to receive a web in the same relative orientation, and
   the corrugations of the second roll serving as means to reduce the time spent by the squeezed-out material at the first nip by allowing material in the standing ridge to migrate into the troughs and so pass through the nip.

2. A calender according to claim 1, wherein the said second roll has the following characteristics at the median line of the corrugation:
   a. the ratio of the length of each crest to the width of each trough being approximately 3:4;
   b. the ratio of the width of each trough to the depth of each trough being approximately 4:1; and
   c. the ratio of the length of each crest to the trough depth being approximately 3:1; and
   said first and second rolls have together the following characteristics:
   a. the ratio of the diameter of the first roll to the diameter of the second roll being approximately 1:1; and
   b. the ratio of the peripheral speed of the first roll to the peripheral speed of the second roll being approximately 1:1.

3. A calender according to claim 1, wherein the said second roll has the following characteristics of the median line of the corrugations:
   a. the ratio of the length of each crest to the width of each trough being approximately 2:1;
   b. the ratio of the width of each trough to the depth of each trough being approximately 3:1; and
   c. the ratio of the length of each crest to the trough depth being approximately 6:1; and
   said first and second rolls have together the following characteristics:
   a. the ratio of the diameter of the first roll to the diameter of the second roll being approximately 2.5:1; and
   b. the ratio of the peripheral speed of the first roll to the peripheral speed of the second roll being approximately 1.05:1.

* * * * *